3,374,085
PROCESS FOR PRODUCING AGGREGATE CONTAINING OXYGEN STEEL PROCESS DUST
Joseph K. Stone, Berkeley, Calif., assignor to Kaiser Industries Corporation, Oakland, Calif., a corporation of Nevada
No Drawing. Continuation-in-part of application Ser. No. 419,604, Dec. 18, 1964. This application June 13, 1966, Ser. No. 558,542
9 Claims. (Cl. 75—3)

ABSTRACT OF THE DISCLOSURE

A usable ferrous material, especially for feeding to an ogygen steel-making furnace, is produced by agglomerating dust recovered from the gases issuing from a basic oxygen steel-making furnace by admixing therewith from 10% to 70% of particles of not less than 20 microns diameter and comprising a material compatible with iron in steel-making operations, and with a cementitious agent, mixing thoroughly to form a uniform mass and then forming the mass into shapes such as pellets or others, the cementitious agent being advantageously a cokable carbonaceous material or a calcium aluminate cement.

---

This application is a continuation-in-part of my co-pending patent application Ser. No. 419,604, filed Dec. 18, 1964, now abandoned.

This invention relates to a process for producing usable ferrous material from the dust resulting from an oxygen steel process, and to the material so produced.

The now familiar oxygen steel process is effected by blowing a stream of substantially pure oxygen vertically downward onto the surface of a ferrous charge contained in an open-mouth converter. Oxygen is introduced through a conduit called a lance which extends into the open mouth of the converter to a position a few feet above the charge. This process quickly converts the ferrous charge to steel and in so doing produces a large volume of hot gas and fume, which is fine dust particles entrained in the gas. The dust must be removed from the gas before the gas can be employed as fuel or discharged to the atmosphere.

The fume or dust may analyze about 60%–65% iron and it is usually low in harmful impurities. In fact, as far as composition is concerned, it may resemble very high grade iron ore concentrate. However, much of the dust that is produced goes unused and in fact accumulates and presents a disposal problem because of a unique characteristic of oxygen steel process fume. Oxygen steel process fume is very difficult to use because it is in the form of dust particles that are usually 5 microns or less in major dimension, and it resists efforts to be economically agglomerated into larger particles. One typical flue dust recovered from the gases issuing from an L–D furnace shows the following chemical composition: 1.5% FeO, 90.0% $Fe_2O_3$, 4.4% $Mn_3O_4$, 1.2% $SiO_2$, 0.4% CaO, 0.2% $Al_2O_3$, and 0.3% $P_2O_5$; and is of the following particle sizing: 20% less than 0.5 micron, 65% from 0.5 to 1.0 micron and 15% 1.0 to 1.5 micron diameter. Other dusts so recovered, on the other hand, exhibit the following chemical composition: 1.3% to 1.9% $SiO_2$, 1.9% to 5.4% CaO, 0.1% to 0.7% $Al_2O_3$, 62.0% to 65.5% Fe and 0.15% to 0.4% MgO, and 90% of its particles are from 0.5 to 1.0 micron in diameter. Thus, there can be added back into the steel-making zone, by the present method iron oxide particles which are reducible by the various reducing agents in such zone, e.g., nonferrous alloying or impurity metals, to give free iron and to form the corresponding nonferrous metal oxide as a slag constituent.

Dust from blast furnaces, ore grinding operations or other iron-making processes, is frequently successfully agglomerated for reuse by bonding it into pellets or briquettes with a cement or cemetitious agent such as bentonite, tar, pitch, molasses, Portland cement, etc. However, attempts to bond oxygen steel process dust into pellets have consistently been unsuccessful because the dust is so fine that it is difficult to disperse within the cement, and instead of having each particle wetted by the cement, the particles accumulate in dry pockets which burst open and blow from the process to which they are charged as a source of iron, thereby increasing the dust load on the system rather than adding ferrous material to the charge. The agglomerates are fed to a zone of very high temperature, e.g., as much as 3,000° F., wherein a very active "blow" is occurring, and under these severe conditions, the dust particles in such dry pockets are readily freed to pass again into the exit gases and on to the collection system. The circulating dust load problem has not been satisfactorily ameliorated.

The present invention now provides a process for agglomerating particles of oxygen steel process dust into solid agglomerates, e.g., pellets, adapted to be fed into such high temperature zones; and also provides a novel product which results from the process. The process of this invention includes providing a solidifiable fluid or semi-fluid or a hydraulic bonding material or cementitious material and agitating or mixing it together with oxygen steel particles and relatively large particles of a compatible material useful in the process reaction. The cement or cementitious agent is agitated until a dispersion of dust and large particles is obtained after which the cement is solidified. An inorganic cement which hardens and sets rapidly is preferred, e.g., highly early strength Portland cent. Solidification may be effected in conjunction with extrusion or casting to obtain separate pieces of the product, which is a solidified matrix surrounding and bonding dispersed large and small particles. In a preferred embodiment, the invention comprises preparing an intimate admixture of a bonding agent and a material compatible with steelmaking processes, such material being of a suitable particle size larger than 20 microns diameter, then incorporating substantially uniformly therein dust recovered from the exit gases from the oxygen steelmaking zone, the compatible material and the dust comprising a major proportion of the total admixture, the bonding agent being present in a minor amount of the total mix. The admixture so prepared is formed into discrete agglomerates or pieces such as pellets, briquettes or the like of a size adapted to be charged into an oxygen steelmaking zone, for example, by forming in a briquetting machine, or by pelleting or casting, or otherwise as desired.

The cementing or bonding materials that can be used in this invention must be materials that are fluid under the conditions of mixing but solidifiable to form firm and solid agglomerates. The cement should be compatible with steelmaking processes, that is, it must be capable of being introduced into iron or steelmaking processes without contaminating the iron product. Preferably the cement is useful in the process by adding needed slag-forming material. Preferably also, the cementitious agent is so selected or added in such amount that the mol ratio of CaO to $SiO_2$ in the slag of the furnace operating zone is at least 3:1. Cements can be of at least two classes. The first class is organic materials adapted to bond metal oxide particles into a coherent agglomerate such as tar, pitch, heavy oil, grease, molasses, etc., which are all materials that are fluid when hot, but set up to a solid or firm plastic mass when cooled. Some organic cements may be liquid at room temperature, but capable of being carbonized or coked to become solid after dust is entrained in it. The organic, carbonaceous materials will vaporize or burn from the steelmaking process without leaving harmful residues. A cokable, carbonaceous agent such as tar or pitch is especially suitable. Preferably such cokable agent is heated to fluidity and admixed with the large, compatible particles which are at about the same temperature.

Another class of cement is inorganic cement such as Portland cement, calcium aluminate such as that available in commerce under the name Lumnite Cement, etc. These materials are compatible because they become part of the slag phase involved in the steelmaking process. The inorganic cements preferably are low in silica and high in such materials as calcium and aluminum oxides in order to help in forming a slag of suitable composition and avoid unfavorable slag compositions. These are hydraulic cements and water is also incorporated to enable hydraulic setting.

The large particles are larger than 20 microns and they can vary greatly in maximum size, but preferably are not larger than about ¼" in major dimension. The preferred particles are from about 0.01 to about 0.15 inch in major dimension. The large particles are of a material compatible with steelmaking processes, such as iron ore, lime, limestone, mill scale, blast furnace dust, fluorspar, particles of Portland cement, magnesia, Lumnite Cement, coke, coal, etc. Preferably, the large particles are materials which add necessary or desirable ingredients either to the iron phase or the slag phase that is produced in the iron or steel-making process. The incorporation of a material such as limestone which decomposes upon heating with evolution of a gas or vapor, can assist penetration of the agglomerates by the hot bath components in the furnace operating zone and assist in controlled dispersion of the agglomerate materials in such bath.

The amount of cement employed is that amount necessary to make a coherent non-dusting agglomeration of particles. Generally, more than 5% by weight of cement will be required and generally less than 40% of cement by weight of the entire composition is necessary. The relatively large particles need be present only in sufficient quantity to assist in forming a mixture and to break up pockets of dust contained in the cement and generally the large particles will constitute from about 10% to about 70% of the particulate additions, and the remainder thereof is fine dust. Larger concentrations of large particles will require less agitation time to produce a non-dusting product.

As an example of the present invention, a useful ferrous material can be made from oxygen steel process dust by first heating tar to its melting point and pouring it into a suitable mixing or kneading device which already contains previously heated ground ore with an average particle size of about 0.1 inch. An amount of particles equal to about twice the weight of the tar is employed. When the ore is thoroughly blended with the tar a quantity of oxygen steel process dust equal approximately to the weight of the ore is added to the tar slowly and while mixing continues. The mixing is continued and the tar is maintained hot and fluid until the particles are dispersed throughout it after which agitation is stopped and the tar is introduced into an extrusion device. The tar-particle mixture is cooled to a temperature at which it is plastic, extruded, and the extruded material is cut into pieces and cooled to hardness. There results a non-dusting hard product having a high content of high grade iron oxide which is suitable as a charge to a blast furnace, an open hearth furnace, an oxygen converter or other pneumatic steelmaking process. Thus, through the process of this invention, an annoying industrial waste may be converted to a high grade ferrous charge material suitable for use in iron and steelmaking processes.

In another example, 20 parts by weight of mill scale are heated to 350° F. and thereby mixed with 5 parts by weight of tar heated to 200° F. and in a fluid state. After mixing for approximately one minute, there are added 40 parts by weight of L–D dust recovered from an oxygen converter and at a temperature of about 300° F. There are then admixed with the previous mixture 10 parts by weight of unheated fluorspar which is required in the L–D process as a slag-forming agent and the whole is thoroughly mixed to form a uniform mass. The mass is formed into sheets on a water-cooled roll-former and the sheets are cut into pieces or blocks suitable for charging into an L–D furnace. The L–D dust referred to herein has an average analysis of 1.6% $SiO_2$, 3.7% CaO, 0.4% $Al_2O_3$, 63.8% Fe in the form of oxide and 0.28% MgO; and 90% is of particle sizing between 0.5 to 1.0 micron diameter. The fluorspar analyses: 81.0% $CaF_2$, 4.75% $SiO_2$, 1.0% $Al_2O_3$ plus $Fe_2O_3$, 1.0% sulfur, remainder $CaCO_3$.

The products made according to the above examples are suitable for charging to an L–D furnace, preferably at the stage in operation where other materials, i.e., molten iron, scrap, etc., are being charged thereto.

It is a particularly advantageous feature to admix cold fine material, e.g., the dust at about room temperature, or below if desired, with the hot mixture of carbonaceous bonding agent and large particles, because this procedure accelerates cooling and setting of the total mix. This makes an economic process; and otherwise there would be required an amount of space for spreading, cooling and setting of the mix, as well as the longer times required for these latter-mentioned procedures.

The parts and percentages given herein are by weight unless otherwise indicated.

What is claimed is:

1. A process for producing an aggregate containing oxygen steel process dust, cement and larger particles of compatible material which comprises:
    (a) admixing particles of material compatible with iron in steel making operations with a minor amount of a cementitious agent,
    (b) said material being of particle sizing not over ¼" and not less than 20 microns in diameter and being present in an amount of from 10% to 70% of the total of said material and said dust,
    (c) then admixing recovered oxygen steel process dust therewith,
    (d) thoroughly mixing the whole to form a uniform mass, and
    (e) forming said mass into shapes for feeding to an oxygen steel-making zone.

2. The process of claim 1 wherein said cementitious agent is a cokable carbonaceous bonding agent.

3. The process of claim 1 wherein said cementitious agent is calcium aluminate and a tempering amount of water is also incorporated.

4. The process of claim 1 wherein said compatible material is iron ore.

5. The process of claim 1 wherein said compatible material is limestone.

6. The process of claim 1 wherein said compatible material is fluorspar.

7. The process of claim 1 wherein said compatible material is aluminum oxide.

8. The process of claim 1 wherein said cementitious agent comprises from 5% to 40% of said aggregate.

9. The process of claim 2 wherein said cokable agent and said compatible particles are admixed in heated state and said dust in cold state is admixed therewith.

References Cited

UNITED STATES PATENTS

| 2,417,493 | 3/1947 | Holz | 75—3 |
| 3,146,088 | 8/1964 | Tsujihata et al. | 75—3 |
| 3,169,054 | 2/1965 | Werner | 75—3 |
| 3,212,877 | 10/1965 | Rueckl | 75—3 |
| 3,262,771 | 7/1966 | Ban | 75—11 |

FOREIGN PATENTS

| 248,437 | 12/1963 | Australia. |
| 726,243 | 3/1955 | Great Britain. |

BENJAMIN HENKIN, *Primary Examiner.*